US012072676B2

(12) United States Patent
Namiki

(10) Patent No.: US 12,072,676 B2
(45) Date of Patent: Aug. 27, 2024

(54) DISPLAY DEVICE AND TIMEPIECE

(71) Applicant: CASIO COMPUTER CO., LTD., Tokyo (JP)

(72) Inventor: Koji Namiki, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/317,486

(22) Filed: May 15, 2023

(65) Prior Publication Data

US 2023/0280698 A1 Sep. 7, 2023

Related U.S. Application Data

(63) Continuation of application No. 17/202,555, filed on Mar. 16, 2021, now Pat. No. 11,693,370.

(30) Foreign Application Priority Data

Mar. 18, 2020 (JP) ................................ 2020-047084
Sep. 24, 2020 (JP) ................................ 2020-159196

(51) Int. Cl.
*G04G 17/06* (2006.01)
*G04C 10/00* (2006.01)

(52) U.S. Cl.
CPC ............. *G04G 17/06* (2013.01); *G04C 10/00* (2013.01)

(58) Field of Classification Search
CPC ...... G04G 17/045; G04G 17/06; G04C 10/00; G06F 3/0443; G06F 3/044; G06F 1/163; G06F 3/0412; G06F 3/047; G06F 3/03547; G06F 3/0446; G06F 3/0416
See application file for complete search history.

(56) References Cited

U.S. PATENT DOCUMENTS

| | | | | |
|---|---|---|---|---|
| 3,638,163 A | | 1/1972 | Loosme | |
| 5,265,071 A | | 11/1993 | Thorgersen et al. | |
| 8,867,321 B2 | * | 10/2014 | Kaltenrieder | G04G 17/045 368/223 |
| 9,864,343 B2 | * | 1/2018 | Balmer | G04G 17/045 |
| 11,693,370 B2 | * | 7/2023 | Namiki | G04G 17/06 368/276 |
| 2012/0119962 A1 | | 5/2012 | Irie | |
| 2015/0060120 A1 | | 3/2015 | Park | |

(Continued)

FOREIGN PATENT DOCUMENTS

| | | |
|---|---|---|
| CN | 1106580 A | 8/1995 |
| CN | 1298626 A | 6/2001 |
| JP | S53-50696 A | 5/1978 |

(Continued)

OTHER PUBLICATIONS

Extended European Search Report dated Jul. 20, 2021 received in European Patent Application No. EP 21162562.9.

(Continued)

*Primary Examiner* — Edwin A. Leon

(74) *Attorney, Agent, or Firm* — Scully, Scott, Murphy & Presser, P.C.

(57) ABSTRACT

A display device includes a display panel that has a curved part at least at a part of an outer edge of the display panel. The display device also includes a bent connector that is arranged along the curved part and electrically connected to the display panel.

20 Claims, 10 Drawing Sheets

(56) References Cited

U.S. PATENT DOCUMENTS

2019/0138136 A1 5/2019 Nakayama

FOREIGN PATENT DOCUMENTS

| | | | |
|---|---|---|---|
| JP | H03-58025 | A | 3/1991 |
| JP | H11-015394 | A | 1/1999 |
| JP | 2009-231457 | A | 10/2009 |
| JP | 2019-086994 | A | 6/2019 |
| JP | 6621881 | B1 | 12/2019 |

OTHER PUBLICATIONS

Notification of the First Office Action dated Mar. 28, 2022 received in Chinese Patent Application No. CN 2021102843312.
Notice of Reasons for Refusal dated May 31, 2022 received in Japanese Patent Application No. JP 2020-159196.
Office Action dated Oct. 27, 2022 received in United States patent Application No. U.S. Appl. No. 17/202,555.
Notice of Allowance dated Feb. 13, 2023 received in United States patent Application No. U.S. Appl. No. 17/202,555.
Partial European search report dated Jun. 26, 2024 received in European Patent Application No. EP 24171353.6.

* cited by examiner

DISPLAY DEVICE AND TIMEPIECE

CROSS-REFERENCE TO RELATED APPLICATIONS

This application is a continuation of U.S. patent application Ser. No. 17/202,555, filed on Mar. 16, 2021 which is based upon and claims the benefit of priority under 35 USC 119 of Japanese Patent Application No. 2020-047084 filed on Mar. 18, 2020, and Japanese Patent Application No. 2020-159196 filed on Sep. 24, 2020, the entire contents of which are incorporated herein by reference.

BACKGROUND OF THE INVENTION

1. Field of the Invention

The present disclosure relates to a display device and a timepiece.

2. Description of the Related Art

A display device including a display panel such as a liquid crystal display is disclosed by, for example, Japanese Patent No. 6621881.

SUMMARY

A display device according to the present embodiment includes: a display panel that has a curved part at least at a part of an outer edge of the display panel; and a bent connector that is arranged along the curved part and electrically connected to the display panel.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION OF THE INVENTION

An embodiment of a display device and a timepiece including the display device will be described with reference to FIG. 1 to FIG. 6.

Various preferable technical limitations to implement the present invention are added to the embodiment described below, but the scope of the present invention is not limited to the embodiment or the illustrated examples described below.

Figure 1:
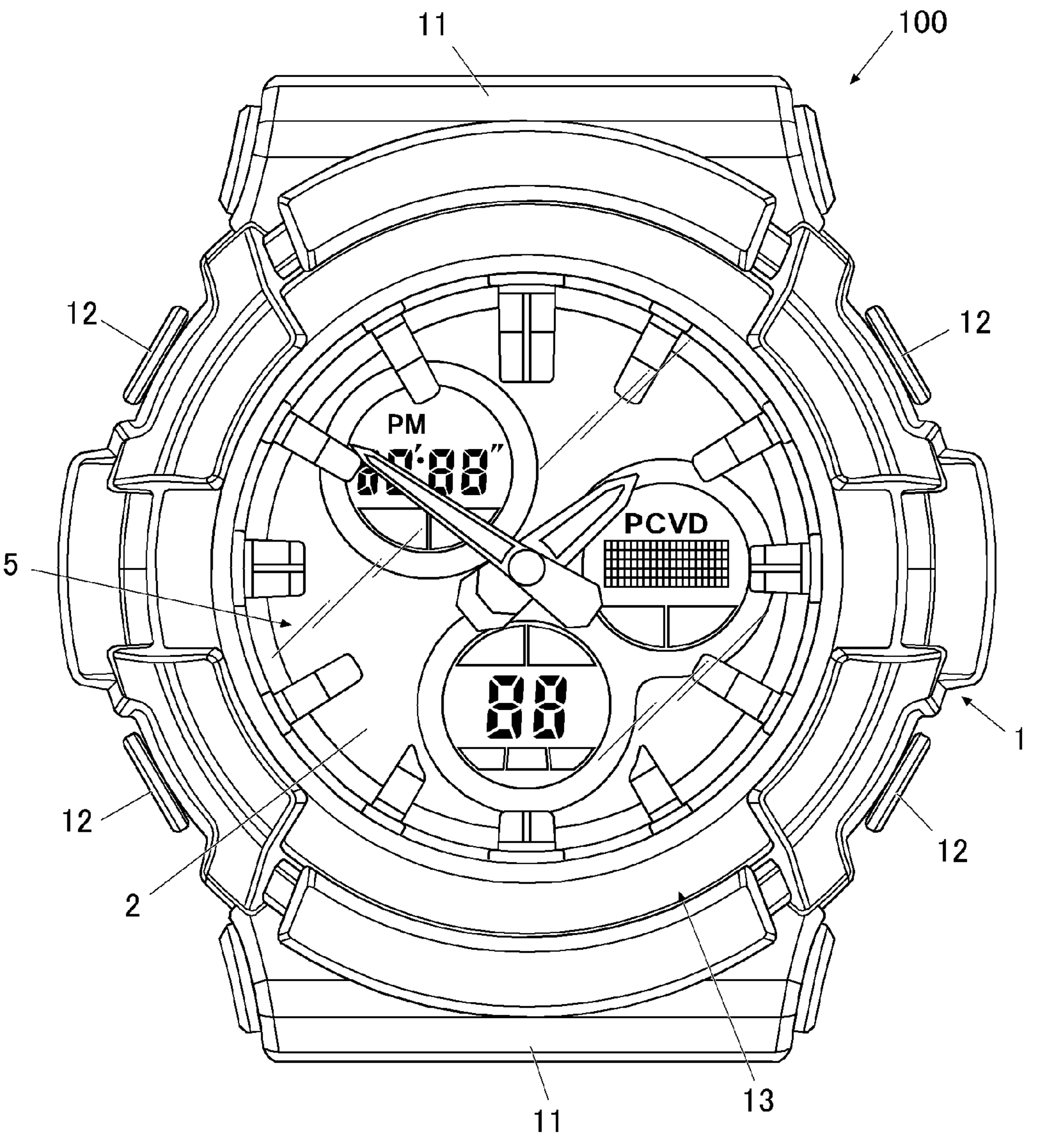
FIG. 1 is a front view of a timepiece according to a present embodiment.

FIG. 1 is a front view of a timepiece according to the present embodiment.

As shown in FIG. 1, a timepiece 100 according to the present embodiment has a substantially circular face (that is, a part where the time is displayed) in a plan view.

The timepiece 100 further has a case (referred to as a "timepiece case 1" in the following embodiment) formed in a shape of a hollow short pillar and having an open top and an open bottom in the thickness direction (respectively on the front and back surface side of the timepiece 100).

The timepiece case 1 is formed of, for example, a hard synthetic resin or a hard material such as metal including titanium, stainless steel (SUS), or the like. The material that forms the timepiece case 1 is not limited to those exemplified above.

The timepiece case 1 has belt attaching parts 11 provided at the upper and lower ends in FIG. 1, that is, at an end at the position of 12 o'clock and at an end at the position of 6 o'clock. To the belt attaching parts 11, a timepiece belt (s) is attached (not shown in the drawings).

The timepiece 100 has an operation button(s) 12 on a lateral side of the timepiece case 1 and the like. In the example shown in FIG. 1, the timepiece case 1 has four push buttons as the operation buttons 12, two at the left side and the other two at the right side.

The timepiece 100 has a windshield 2 at the opening on the front surface side of the timepiece case 1 to cover the opening. The windshield 2 is formed of transparent glass or the like and allows light to pass through.

The timepiece 100 has a back cover not shown in the drawings formed on the back surface side of the timepiece case 1 to close the opening.

In the timepiece case 1 of the present embodiment, there are accommodated a module 3 that operates each component of the timepiece 100 (a timepiece module including a time measurement circuit and the like as a time measurement unit that executes time measurement, see FIG. 3) and a substrate 4 described later. The module 3 is accommodated in a module case 31 (see FIG. 3) formed of resin or the like that is accommodated in the timepiece case 1. The substrate 4 is arranged on the upper side (a visible side or the front surface side of the timepiece) of the module case 31. On the substrate 4, for example, various electronic components (not shown) are mounted, such as a CPU (for example, a one-chip CPU) that controls the entire timepiece 100 including a display device 50.

The display device 50 is provided above the module 3 (on the visible side or the front surface side of the timepiece) and between module 3 and the windshield 2. The display device 50 of the present embodiment includes a display panel 5 and a connector 6 (see FIG. 2 and FIG. 3). The display device 50 may include a substrate 4 in addition to the display panel 5 and the connector 6.

Figure 2:
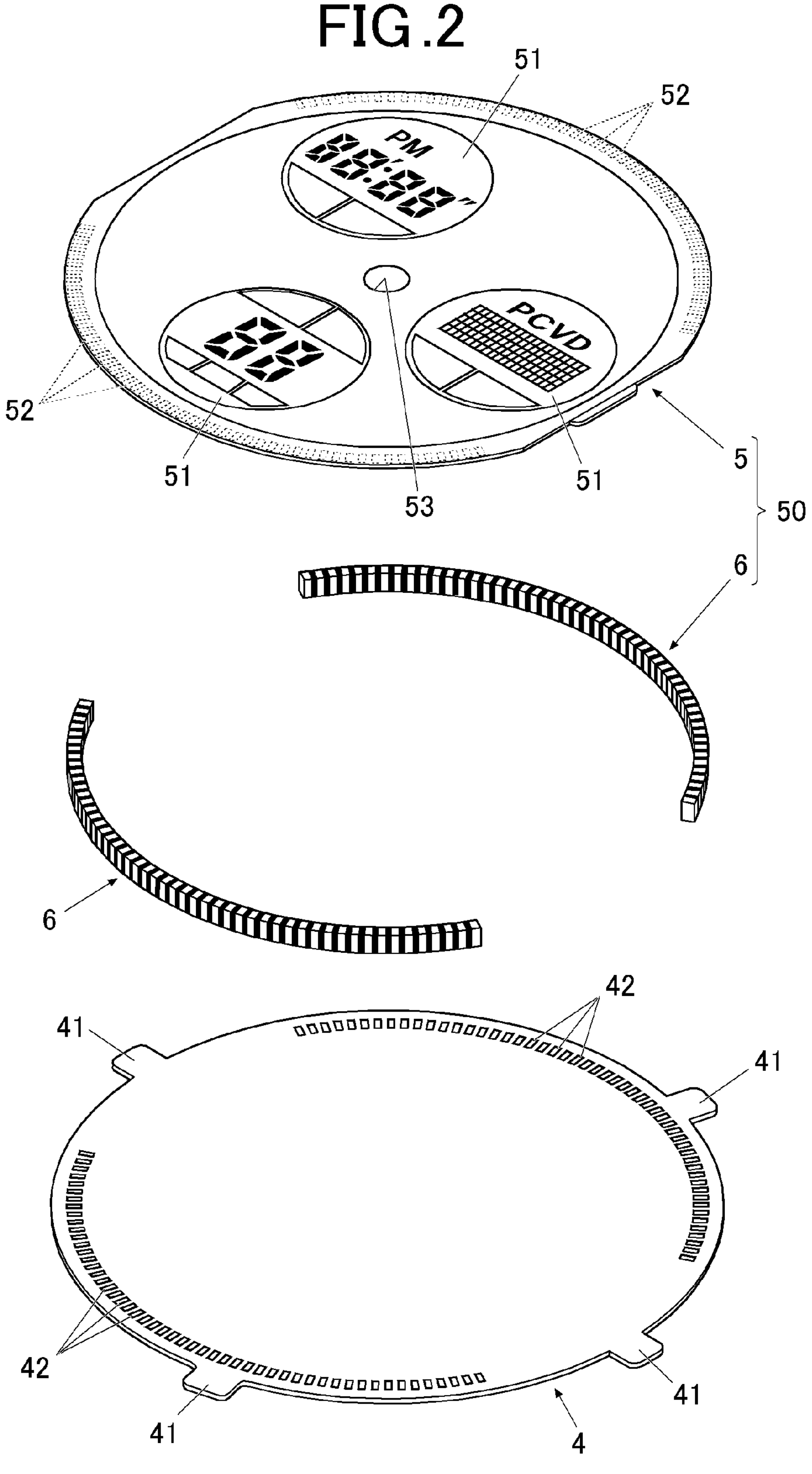
FIG. 2 is an exploded perspective view of a display device and a substrate according to the present embodiment.

FIG. 2 is an exploded perspective view of main parts showing the display panel 5 and the connector 6 constituting the display device 50, and the substrate 4. FIG. 3 is a plan view showing the display device 50 of the present embodiment and members in the vicinity thereof.

Figure 3:
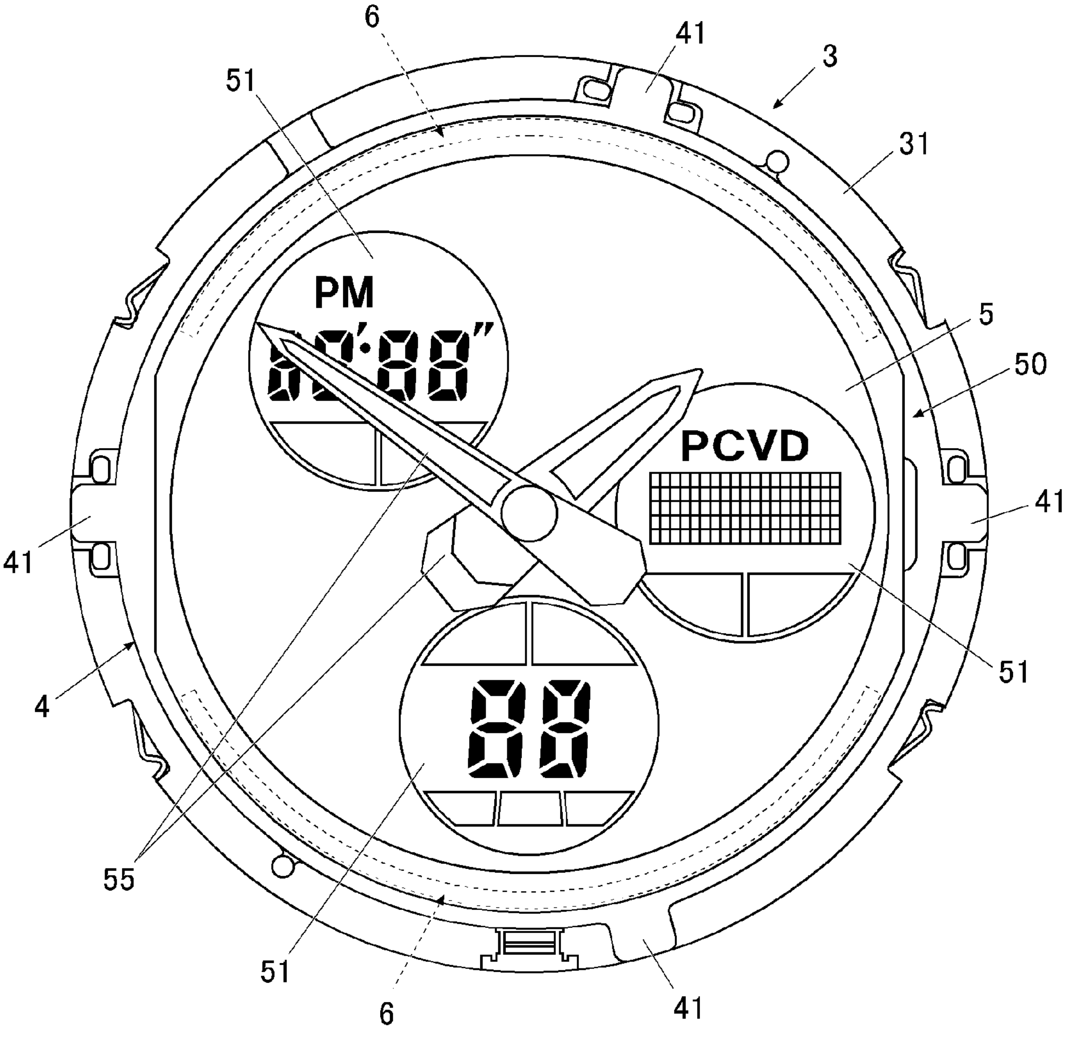
FIG. 3 is a plan view of the display device and members in the vicinity thereof according to the present embodiment.

As shown in FIG. 2 and FIG. 3, the display device 50 of the present embodiment has a shape corresponding to that of the face of the timepiece 100, specifically, a substantially circular shape in a plan view.

As shown in FIG. 2, the substrate 4 and the display device 50 overlap each other and are arranged on the upper surface of the module case 31 of the module 3 (on the visible side surface of the timepiece 100).

The display panel 5 of the display device 50 has a curved part at least at a part of the outer edge. As shown in FIG. 2, in the present embodiment, the display panel 5 is a plate member having a substantially circular shape in a plan view, so that almost all of the outer edge of the display panel 5 is the curved part.

The display panel 5 includes, for example, a liquid crystal display (LCD), an organic electroluminescence display, or other flat display.

The display panel 5 (liquid crystal panel or the like) may include either a reflective type or a transmissive type display element(s).

The display panel 5 has electrodes 52 on the back side (an invisible side when embedded in the timepiece 100, a lower side in FIG. 2) surface that are arranged along the curved part at the outer edge of the display panel 5. The electrodes 52 are connected to one (first) side of the connector 6.

The electrodes 52 are arranged at predetermined intervals. In the present embodiment, the electrodes 52 are arranged so as to form wide arcs at the 12 o'clock side edge and the 6 o'clock side edge of the timepiece 100.

The display device 50 of the present embodiment has a digital display means including a display panel 5 composed of a liquid crystal panel and the like, and an analog display means including hands 55 and the like.

The display panel 5 has a shaft hole 53 through which a rotating shaft of the hands 55 are inserted almost in the center of the display panel 5.

The display device 50 is not particularly limited, and may consist of a digital display means only, having a display panel 5 including of a liquid crystal panel and the like.

When embedded in the timepiece 100, the outer peripheral part (the outer edge and the like) of the display device 50 is covered with an exterior member (an exterior member 13 in FIG. 1) such as a parting plate or a bezel such that the outer edge is invisible from the outside.

In the present embodiment, as shown in FIG. 2 and FIG. 3, the display panel 5 has three circular display areas 51. In the respective display areas 51, information on time, date, and the like is appropriately displayed.

Specifically, one of the display areas 51 is arranged almost at a 3 o'clock position of the timepiece, another at a 6 o'clock position, and the other at a 10 o'clock to 11 o'clock position.

Figure 4:
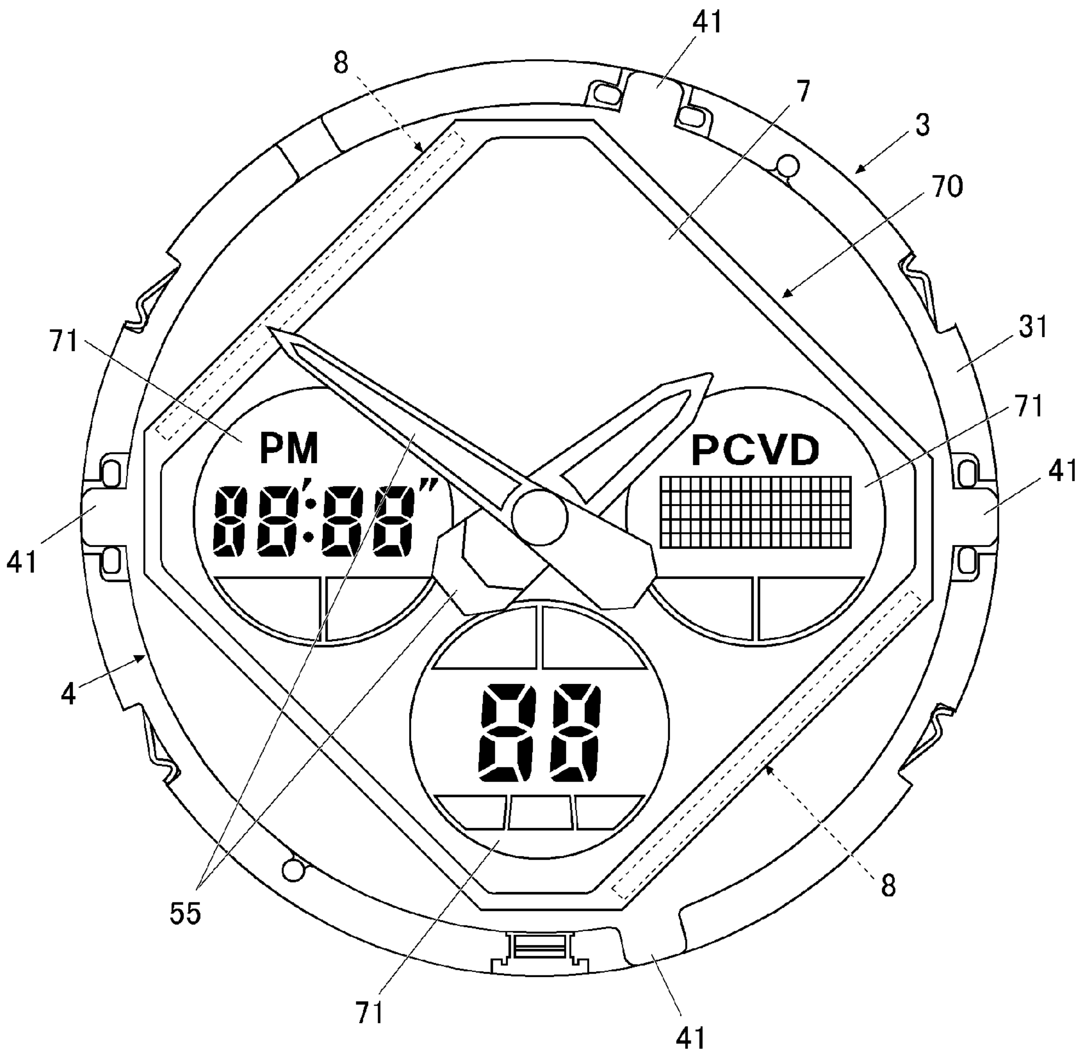
FIG. 4 is a plan view of a conventional display device and members in the vicinity thereof.

FIG. 4 is a plan view showing a conventional display device 70 and its peripheral members when the display panel 7 has a rectangular shape. The same parts as those in FIG. 3 are designated by the same reference numerals and the description thereof is omitted.

As shown in FIG. 4, the display device 70 has a substantially rectangular display panel 7 and linear connectors 8 that are arranged corresponding to electrodes linearly arranged along any of the outer peripheral sides of the display panel 7 (along the upper left side and the lower right side in FIG. 4).

In such a rectangular display panel 7, three circular display areas 71 are each arranged almost at a 3 o'clock position, 6 o'clock position, 9 o'clock position, or 12 o'clock position of the timepiece (in FIG. 4, one is arranged almost at a 3 o'clock position, another at 6 o'clock position, and the other at 9 o'clock position).

When the display panel 7 has a rectangular outer shape as described above, large spaces where the respective display areas 71 can be arranged are secured only at the corners. As a result, the display areas 71 cannot be arranged at positions other than the corners (for example, at a 10 o'clock position, 2 o'clock position, and 5 o'clock position). Therefore, the design of the display device 70 constituting the face of the timepiece is limited. It is not possible to realize a flexible design making full use of the entire face of the timepiece according to the shape of the face.

However, according to the present embodiment in which the display panel 5 of a circular shape or the like has a curved part, the display area(s) 71 can be freely arranged at any position in the circumferential direction of the display panel 5, and the face of the timepiece can be more flexibly deigned.

The display panel 5 is electrically connected to the substrate 4 by the connector 6.

As shown in FIG. 2, the substrate 4 is formed in a substantially circular shape in a plan view so as to correspond to the shape of the display panel 5.

In the example shown in FIG. 2, the substrate 4 has a plurality of positioners 41 (four in the illustrated example) on the outer periphery. For example, on the 3 o'clock side and the 9 o'clock side of the timepiece, the respective positioners 41 are arranged to determine the position of the substrate 4 with respect to the module 3. The positioners 41 are fitted into respective recessed portions for positioning that are preferably formed on the upper outer periphery of the module case 31.

The substrate 4 has connection terminals 42 that are arranged on the front side (the visible side when embedded in the timepiece 100, upper side in FIG. 2) surface of the substrate 4 along the curved part(s) at the outer edge of the substrate 4 so as to correspond to the electrodes 52 of the display panel 5.

The connection terminals 42 are arranged at a position (s) and within a range (s) corresponding to the electrodes 52 of the display panel 5, and are arranged in a shape having the same curvature as the shape in which the electrodes 52 are arranged. The connection terminals 42 are connected to the other (second) side of the connector 6, one (first) side of which is connected to the electrodes 52 of the display panel 5.

As shown in FIG. 2 and the like, the connector 6 is bent to be in a curved or angular shape depending on the curvature of the curved part, arranged along the curved part of the display panel 5, and is electrically connected to the electrodes 52 of the display panel 5.

Figure 5:
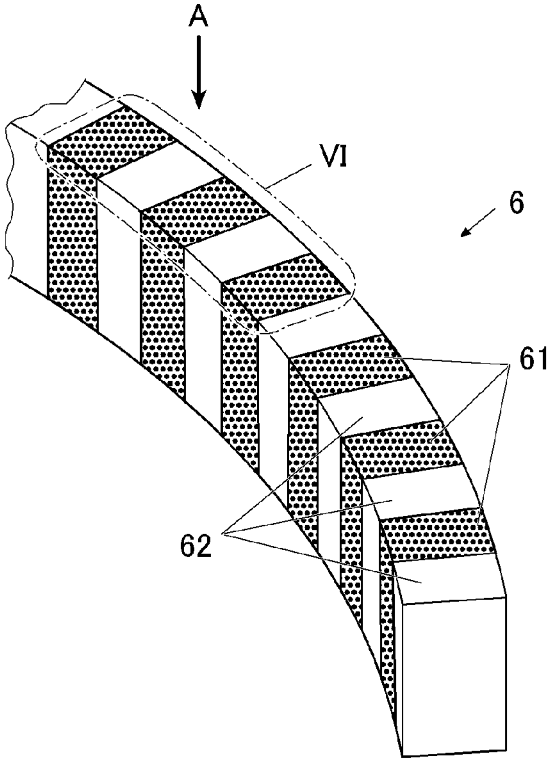
FIG. 5 is an enlarged perspective view of a main part of a connector according to the present embodiment.
Figure 6:
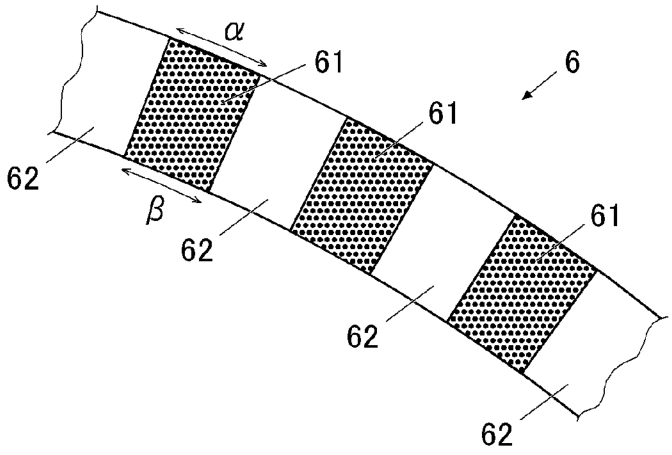
FIG. 6 is a plan view of a portion indicated by the alternate long and short dash line VI of the connector of FIG. 5 as viewed from the direction of arrow A.

FIG. 5 is a partial enlarged perspective view of the connector 6. FIG. 6 is a plan view of the connector 6 in FIG. 5 in the range enclosed by the alternate long and short dash line as viewed from the direction of arrow A.

As shown in FIG. 5 and FIG. 6, the connector 6 includes conductive parts 61 and insulating parts 62 arranged alternately in the extending direction of the connector 6 and respectively at the intervals of the electrodes 52 of the display panel 5 and the connection terminals 42 of the substrate 4. In the present embodiment, the dimension of the conductive parts 61 and the dimension of the insulating parts 62 in the extending direction of the connector 6 are substantially the same.

The conductive parts 61 are formed of a conductive member, and the insulating parts 62 are formed of an insulating member.

The conductive member that forms the conductive parts 61 is not particularly limited as long as it is a conductive material. The insulating member that forms the insulating parts 62 is not particularly limited as long as it is an insulating material.

The connector 6 of the present embodiment has a flexible part(s) that is bent so as to have a curved shape along the curved part of the display panel 5 as described above, thereby being able to be arranged in a curved state depending on the curvature of the curved part of the display panel 5. In the present embodiment, the flexible parts are the conductive parts 61 formed of the conductive member. That is, the conductive parts 61 are made of a soft resin having a relatively high softness such as conductive rubber, and are more flexible than the insulating parts 62.

As a result, in the connector 6 in the curved state, one lateral surface of the conductive part 61 is extended, and the other lateral surface is unchanged or slightly contracted. That is, in the connector 6 of FIG. 6, particularly the conductive parts 61 are each bent (curved) to a substantially annulus sector shape in a plan view. The bent conductive parts 61 each have an inner surface that is arranged to face inside (a concave side) of the curved part of the display panel 5 and an outer surface that is arranged to face outside (a convex side) of the curved part. The outer surface is larger than the inner surface, as a result of extension of the length "α" of the outer surface and slight contraction of the length "β" of the inner surface in the extending direction of the connector 6. As a result, the entire connector 6 of FIG. 6 extends in an arc.

Next, the operation of the display device 50 and the timepiece 100 as an electronic device including the display device 50 of the present embodiment will be described.

When the display device 50 of the present embodiment is assembled, first, the substrate 4 is arranged on the upper surface of the module case 31. At this time, the orientation of the substrate 4 is adjusted so that the positioners 41 are arranged at respective predetermined positions (for example, the 3 o'clock side and the 9 o'clock side of the timepiece 100).

After the substrate 4 is positioned, the connector(s) 6 is curved and arranged corresponding to the connection terminals 42 of the substrate 4. The connector 6 may be supported by the upper surface of the module case 31 or a separately provided frame body to be held at a predetermined position.

After the connector 6 is arranged corresponding to the connection terminals 42 of the substrate 4, the display panel 5 is arranged on the upper side (the visible side in the timepiece 100) of the substrate 4, so as to overlap the substrate 4 and so that the electrodes 52 face the connection terminals 42 of the substrate 4 with the connector 6 in between.

As a result, the electrodes 52 of the display panel 5 are electrically connected to the connection terminals 42 of the substrate 4 by the connector 6, and the assembly of the display device 50 is completed.

In this way, the display device 50 is connected to the substrate 4 at the electrodes 52 that are formed along the curved part on the outer edge of the circular display panel 5. Therefore, the display area(s) 51 can be freely set within the wide display panel 5, and the display device 50 can be designed more flexibly.

The procedure for assembling the display device 50 is not limited to the one described above.

For example, after the display panel 5 is arranged in the module case 31 from the back surface side (the invisible side of the timepiece 100) of the module case 31, the connector 6 may be arranged at a position corresponding to the electrodes 52 of the display panel 5, and the substrate 4 may be arranged such that the connection terminals 42 correspond to the connector 6.

Next, the display device 50 is embedded in the timepiece case 1 of the timepiece 100.

At this time, the display area (s) 51 of the display panel 5 is adjusted so as to be arranged at a desired position on the face of the timepiece 100.

Then, the display device 50, the substrate 4, the module 3, and the like are accommodated in the timepiece case 1, and the windshield 2 and the back cover are attached to the timepiece case 1 to airtightly seal the opening.

In this way, the assembly of the timepiece 100 is completed.

For example, Japanese Patent No. 6621881 discloses display devices including a rectangular display panel such as a liquid crystal display.

Display devices are expected to be embedded into various electronic devices. However, when a display device having a rectangular display panel is embedded into an electronic device having a shape other than a rectangle (for example, a timepiece with a circular or oval face), it is not possible to use the entire space in the electronic device for displaying, that is, edges of the space are also designed to be utilized for display, but cannot be effectively used in fact.

According to the present embodiment, the display device 50 includes the display panel 5 having a curved part at least at a part of the outer edge, and the connector 6 electrically connected to the display panel 5 and arranged in a curved state curved depending on the curvature of the curved part so as to be along the curved part.

As a result, the display area (s) 51 can be arranged more freely in the display device 50 than in a display device having a rectangular display panel, and the entire space in the display panel 5 can be utilized for display.

Furthermore, the connector 6 of the present embodiment includes the conductive parts 61 formed of a conductive member and the insulating parts 62 formed of an insulating member that are arranged alternately in the extending direction of the connector 6.

As a result, the electrodes 52 of the display panel 5 can be electrically connected to the connection terminals 42 of the substrate 4 securely and simply.

Furthermore, according to the present embodiment, the connector 6 has the flexible part (s) that can be bent to a curved shape along the curved part of the display panel 5. The conductive parts 61 formed of the conductive member function as the flexible parts.

When the conductive parts 61 is more flexible than the insulating parts 62, the electrodes 52 of the display panel 5 and the connection terminals 42 of the substrate 4 can be electrically connected to each other by a large area. Therefore, the display panel 5 and the substrate 4 can be electrically connected to each other more reliably and stably.

Furthermore, in the present embodiment, the connector 6 bent to a curved state has a surface area of the outer surface that faces the convex side of the curved part is larger than a surface area of the inner surface that faces the concave side of the curved part.

As a result, the connector 6 has a curved shape along the curved part of the display panel 5 without difficulty and provides stable electrical connection of the display panel 5 and the substrate 4

Furthermore, in the present embodiment, the electrodes 52 of the display panel 5 connected to one side of the connector 6 are arranged along the curved part of the display panel 5, and the connection terminals 42 of the substrate 4 connected to the other side of the connector 6 are arranged along the curved part corresponding to the electrodes 52 of the display panel 5.

In this way, because both the electrodes 52 of the display panel 5 and the connection terminals 42 of the substrate 4 are arranged along the curved part of the display panel 5, electrical connection can be appropriately made even when the display panel 5 has a circular shape or the like. In such a display device 50, the connector 6 formed of a resin such as rubber is used to electrically connect the electrodes 52 of the display panel 5 and the connection terminals 42 of the substrate 4, such that a simple and inexpensive configuration can be realized.

Furthermore, because the connector 6 is arranged corresponding to the edge of the substrate 4 and the edge of the display panel 5, the space between the substrate 4 and the display panel 5 can be effectively utilized. That is, the space is large when the connector 6 is arranged at the edge of the substrate 4 and the edge of the display panel 5, such that other components can be easily arranged there.

Furthermore, on the substrate 4, various electronic components, wires, and the like are mounted.

Figure 10:
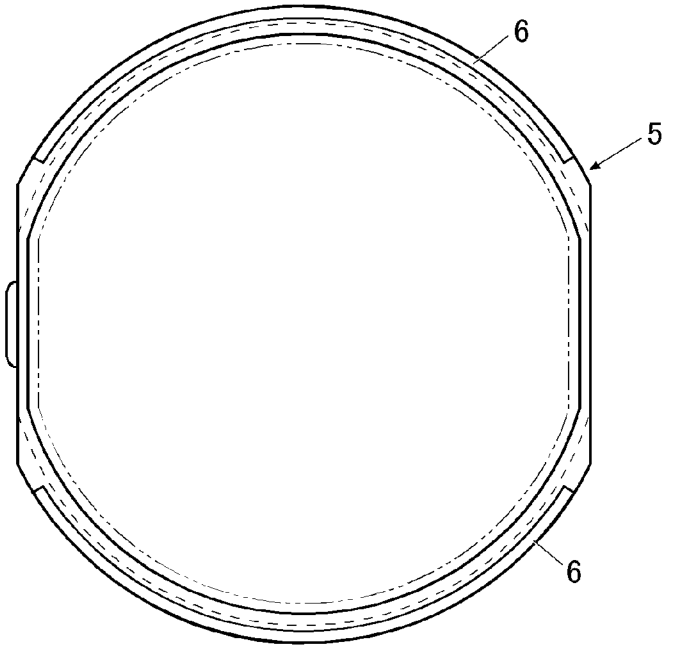
FIG. 10 is a plan view showing a positional relationship between the display device and connectors according to the present embodiment.
Figure 11:
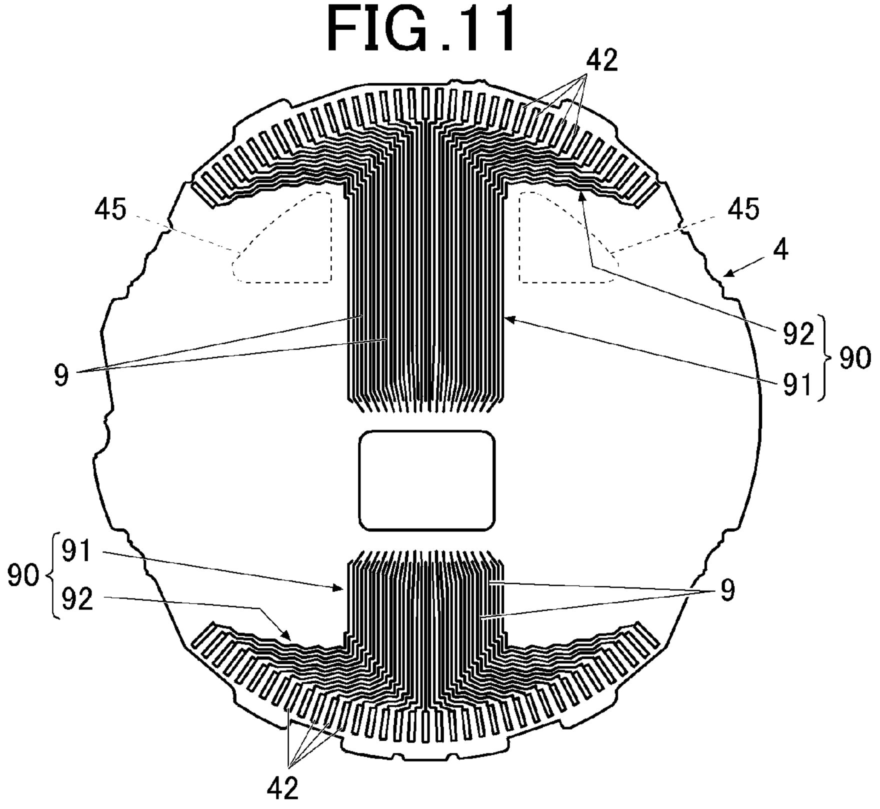
FIG. 11 is a plan view showing an example of the substrate and wires mounted on the substrate according to the present embodiment.

FIG. 10 is a plan view showing the display panel 5 and the connectors 6 of the present embodiment. FIG. 11 is a plan view of the substrate 4 corresponding to the display panel 5 and the connectors 6 in FIG. 10 as viewed from the front surface side (the side facing the display panel 5).

As shown in FIG. 10, the display panel 5 has curved parts at the outer edge of the display panel 5, and provided with electrodes of the display panel 5 along the curved outer edge. The connectors 6 that connect the electrodes of the display panel 5 to the connection terminals 42 of the substrate 4 are also arranged along the outer edge (curved parts) of the display panel 5.

In this case, the substrate 4 is provided with wires 9 as shown in FIG. 11 on the side facing the display panel 5 (the visible side in the timepiece).

One end of each of the wires 9 is connected to the connection terminal 42 of the substrate 4, and the other end is connected to an integrated circuit such as an LSI (Large Scale Integration) arranged at the center of the substrate 4, for example. The wires 9 are arranged in a wiring area(s) 90 each including a bundle area 91 where the wires 9 are linear and bundled and an unbundle area 92 where the wires 9 diverges from the bundle area 91 toward the respective connection terminals 42 (see FIG. 11).

When the electrodes of the display panel 5 are arranged along the outer edge (curved parts) of the display panel 5 as in the present embodiment, the connection terminals 42 of the substrate 4 are also arranged curvedly along the outer edge corresponding to the electrodes.

In this case, the unbundle area 92 is formed along the curved part corresponding to the connection terminals 4 arranged along the curved part of the display panel 5.

That is, as shown in FIG. 11, the bundle area 91 extends to a vicinity of the outer edge of the substrate 4, and the unbundle area 92 having a shape along the curved part is formed with the wires 9 diverging radially near the connection terminals 42.

In the present embodiment, the unbundle area 92 is formed in a substantially crescent shape as a whole, along the curved part of the display panel 5 (see FIG. 11). The unbundle area 92 may have any shape as long as it is along the curved part corresponding to the arrangement of the connection terminals 4, and the entire shape thereof is not limited to the illustrated example. The unbundle area 92 may be formed, for example, in a circular segment shape.

Figure 12:
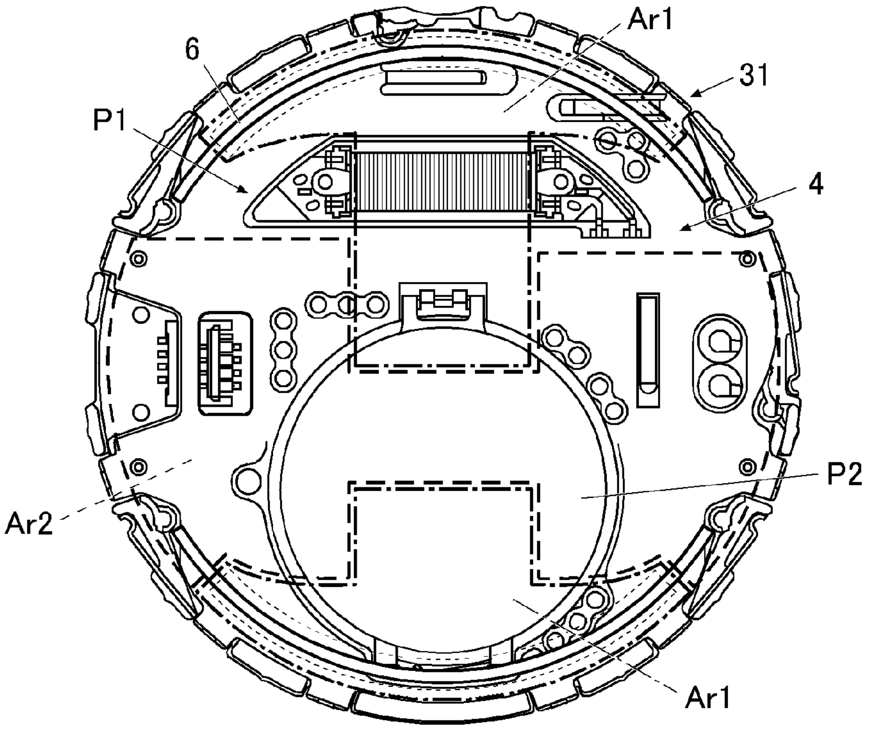
FIG. 12 is a plan view showing an example of the substrate according to the present embodiment in which components are mounted on the back surface side.

FIG. 12 is a plan view of the substrate 4 of the present embodiment as viewed from the back surface side (the invisible side).

In FIG. 12, the areas enclosed by alternate long and short dash lines are areas where the wiring areas 90 are provided on the front surface side of the substrate 4.

The wires 9 generate noise that interferes with various electronic components. Therefore, electronic components that highly need to avoid the influence of noise cannot be arranged to be mounted on the back surface of the substrate 4 in a noise area(s) Ar1 corresponding to the wiring area(s) 90.

The electronic components that highly need to avoid the influence of noise include an antenna P1, for example. In particular, the end of the antenna P1 needs to be arranged so as to avoid the noise area Ar1. On the front surface side of the substrate 4, non-wiring areas 45 where wiring patterns or the like cannot be formed are set corresponding to the area where the end of the antenna P1 is to be located.

An area other than the noise area Ar1 and an area where the antenna P1 is to be arranged is a component arrangement area Ar2 where components that highly need to avoid the influence of noise are mounted.

A component(s) with which noise hardly interferes (for example, the battery P2 shown in FIG. 12) may be arranged in the noise area Ar1, but is preferably arranged at an inner side the connector 6.

When the electrodes 52 of the display panel 5 and the connection terminals 42 of the substrate 4 corresponding thereto are arranged curvedly along the outer edge as in the present embodiment, the wiring area 90 includes the bundle area 91 extending to the vicinity of the outer edge of the substrate 4 and the unbundle area 92 having a shape along the curved part as described above. Therefore, as shown in FIG. 12, the antenna P1 can also be arranged close to the outer periphery of the substrate 4, and the relatively large component arrangement area Ar2, which is the area avoiding the noise area Ar1 and the antenna P1, can be secured.

Figure 13:
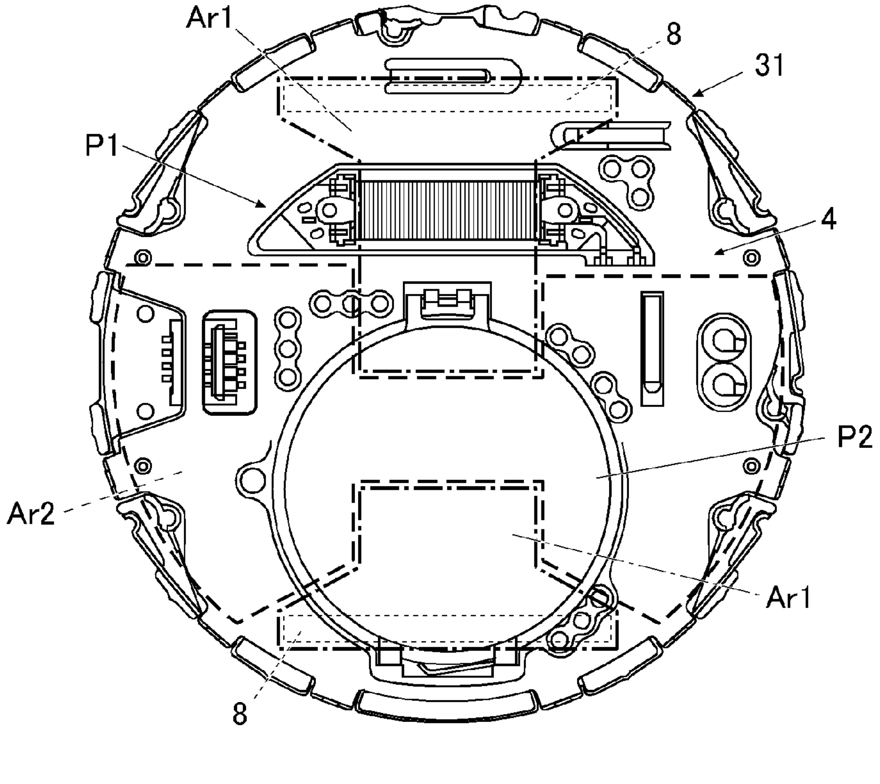
FIG. 13 is a plan view showing an example of a substrate in which components are conventionally mounted on the back surface side.

FIG. 13 is a plan view of the substrate 4 as viewed from the back surface side (the invisible side) when the electrodes of the display panel, the connection terminals of the substrate 4 corresponding thereto, and the connector 8 that electrically connects them are linear.

When the electrodes of the display panel are linear, the connection terminals of the substrate 4 and the connector 8 to be connected to the connection terminals 4 cannot be at the positions close to the outer edge of the substrate 4 having a circular shape as shown in FIG. 13. Then, the wiring area 90 (the unbundle area 92) cannot be provided close to and along the outer edge of the substrate 4, and the antenna P1 that is arranged so as to avoid the noise area Ar1 is arranged away from the outer edge of the substrate 4 as a whole. Therefore, the component arrangement area Ar2 becomes narrow, and the arrangement of various components is restricted.

However, when the electrodes 52 of the display panel 5 and the like have a curved shape as in the present embodiment, as shown in FIG. 12, the connection terminals 42 of the substrate 4 and the connector 6 to be connected to the connection terminals 42 can be positioned close to the outer edge of the substrate 4. Then, the wires 9 can also be wired around the outer shape of the substrate 4 or the like. Therefore, as compared with the case as shown in FIG. 13 in which the electrodes of the display panel is linear, it is possible to secure a large component placement area Ar2, which allows various components to be freely mounted, even a large component that needs to be arranged avoiding the noise area Ar1.

When the display device 50 having the circular display panel 5 as shown in the present embodiment is applied to the timepiece 100, the display area(s) 51 can be efficiently arranged in the circular face of the timepiece 100 up to the edge.

As a result, it is possible to secure the large display area 51 and perform various displays. Furthermore, the timepiece 100 having excellent design can be realized by the display area 51 laid out more freely. In such a display device 50, the connector 6 formed of a resin such as rubber is used to electrically connect the electrodes 52 of the display panel 5 and the connection terminals 42 of the substrate 4, such that the timepiece 100 having excellent appearance and a simple and inexpensive configuration can be realized.

Although the embodiments have been described above, the present invention is not limited to these embodiments and can be modified in various ways without departing from the gist thereof.

For example, the shape and configuration of the connector 6 are not limited to those shown in the above embodiment as long as the connector 6 is arranged along the curved part of the display panel 5 in a curved state depending on the curvature of the curved part and is electrically connected to the display panel 5.

Figure 7:
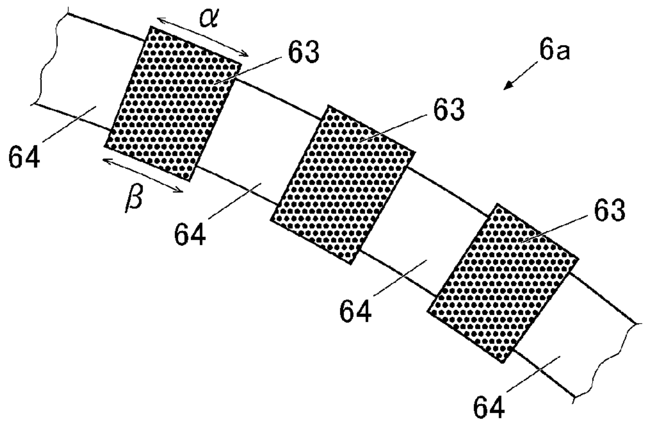
FIG. 7 is a plan view showing a modified example of a connector.
Figure 8:
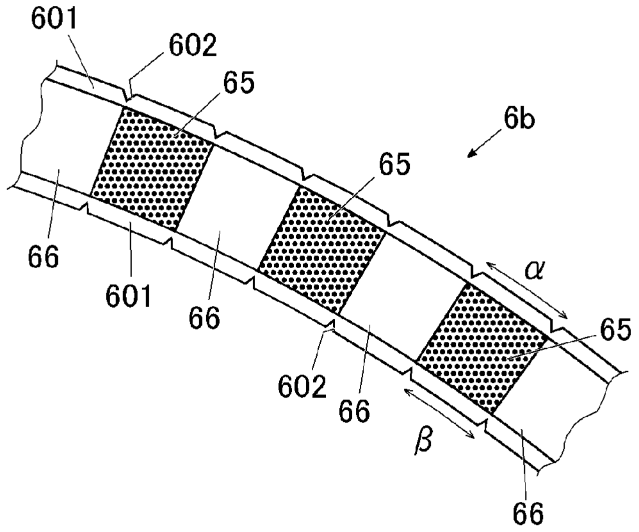
FIG. 8 is a plan view showing a modified example of a connector.
Figure 9:
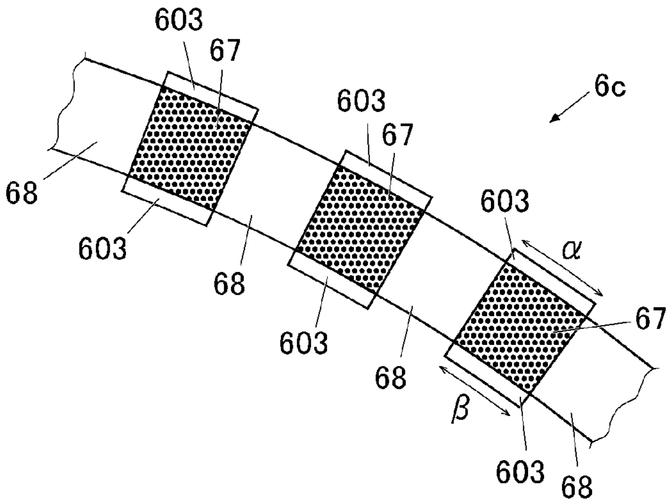
FIG. 9 is a plan view showing a modified example of a connector.

For example, as shown in FIG. 7 to FIG. 9, connectors **6*a* to 6*c*** may have an uneven lateral surface(s). The uneven surface includes recesses and projections that are alternately arranged in the extending direction of the connector.

The connector provided with the uneven surface on the lateral side as described above can be bent easily according to the curvature of the curved part of the display panel 5, so as to be curved into a curved shape without difficulty.

Also in the connector **6*a* in the curved state, the length "α" of the outer surface of the conductive parts 63 in the extending direction extends more than, that is, has a larger amount of change than, the length "β" of the inner surface of the conductive parts 63** in the extending direction.

The uneven surface on the lateral surface of the connector may be formed as the uneven surface in the connector **6*a* shown in FIG. 7, for example, which has the recesses composed of the insulating parts 64 formed of the insulating member and the projections composed of the conductive parts 63 formed of the conductive member having more flexibility than the insulating member of the insulating parts 64**.

Because of the conductive parts 63 having more flexibility than the insulating parts 64 as described above, the conductive parts 63 can be bent more flexibly. Furthermore, when the conductive parts 63 are the large protrusions, the electrical connection portions can be formed to be large between the electrodes 52 of the display panel 5 and the connection terminals 42 of the substrate 4. As a result, the display panel 5 can be electrically connected to the substrate 4 more reliably and stably.

Alternatively, the connector **6*b* in FIG. 8 has an insulating layer 601 on at least one of the convex side surface and the concave side surface on the insulating parts 66 and conductive parts 65. The material and layer thickness of the insulating layer 601** are set as appropriate.

When the insulating layer 601 is provided on the lateral surface of the connector **6*b* in this way, the connector 6*b* can be protected from interference of various metal parts and the like existing inside the timepiece case 1, and can electrically connect the display panel 5 and the substrate 4 to each other more safely and stably. Furthermore, because of the protection by the insulating layer 601, the connector 6*b*** can be arranged close to the metal parts or the like, and the display area(s) can be laid out far more freely.

Alternatively, as shown in FIG. 8, the insulating layer 601 of the connector **6*b* may have recess parts and projecting parts alternately arranged in the extending direction of the connector 6*b*, such that the recess parts and the projecting parts of the insulating layer 601 respectively form the recesses and projections of the uneven surface on the lateral side of the connector 6*b***.

Specifically, for example, recess parts 602 such as notches, grooves, or the like are formed between the conductive parts 65 and the insulating parts 66. The parts of the insulating layer 601 where the recess parts 602 are not formed are the relative projections.

Such a connector **6*b* can also be easily curved at portions where the recess parts 602 are formed so as to be bent to a curved shape without difficulty according to the curvature of the curved part of the display panel 5**.

Also in the connector **6*b* in the curved state, the length "α" of the outer surface of the conductive parts 65 in the extending direction extends more than, that is, has a larger amount of change than, the length "β" of the inner surface of the conductive parts 65** in the extending direction.

Alternatively, in the connector **6*c* in FIG. 9 having insulating parts 67 formed of the insulating member and conductive parts 68 formed of the conductive member alternately arranged in the extending direction, insulating layers 603 may be arranged correspond only to the conductive parts 67, such that the projections and the recesses of the uneven surface are respectively formed of parts having the insulating layers 603 and parts not having the insulating layers 603**.

The insulating layer 603 can also appropriately protect the conductive parts 67, which are easily interfered or affected by metal parts and the like.

Such a connector **6*c* can also be curved easily due to the recesses so as to be bent to a curved shape without difficulty according to the curvature of the curved part of the display panel 5**.

Also in the connector **6*c* in the curved state, the length "α" of the outer surface of the conductive parts 67 in the extending direction extends more than, that is, has a larger amount of change than, the length "β" of the inner surface of the conductive parts 67** in the extending direction.

The specific arrangement position, range, and the like of the electrodes 52 of the display panel 5 and the connection terminals 42 of the substrate 4 corresponding thereto are not limited to those in the above embodiment but are appropriately set according to the item(s) to be displayed on the display device 50, the size and position of the display area 51, and the like.

The display panel 5 of the display device 50 is not limited to have a circular shape having a curved part on the entire outer periphery as in the present embodiment, as long as it has a curved part at least at a part of the outer edge.

For example, the display panel 5 may have an elliptical shape or the like in a plan view. Alternatively, the display panel 5 may have a D-shape (semi-elliptical shape) having one curved part or a barrel-shape (bulged rectangle shape) having two convex sides facing each other.

The display panel 5 can be formed in any shape depending on the shape of the device into which the display device 50 is embedded, such that the display device having an excellent design can be realized by the display area 51 laid out freely.

In the above-described present embodiment, the connector 6 has a curved shape as the conductive parts of the connector 6 are bent, but the configuration of the connector 6 that can be bent to a curved shape is not limited thereto.

For example, the insulating parts of the connector 6 may be formed of a flexible material as well as or instead of the conductive parts, so that the connector 6 is in a curved shape in response to bending of the conductive parts and the insulating parts or bending of the insulating parts.

The configuration that makes it easy to curve the connector 6 is not limited to the examples described above.

For example, the connector 6 may have cuts made at a plurality of positions along the extending direction. Such cuts are preferably made at approximately equal intervals such that the entire connector 6 can be evenly curved.

For example, the connector 6 may have cavities formed inside so as to be curved easily.

The connector 6 may be provided with the conductive parts and the insulating parts having different shapes, so as to be easily curved as a whole.

The connector 6 may be provided with the conductive parts and the insulating parts having different volumes, so as to be easily curved as a whole.

After being bent to a curved shape along the curvedly arranged electrodes 52 of the display panel 5 and the connection terminals 42 of the substrate 4, the connector 6 may be subjected to a treatment including a temperature change or a chemical reaction, so as not to be bent further (so as to remain in the curved state).

The display device may further have an arrangement part in the module case 31 for arranging the connector 6 in a curved shape along the curved part of the display panel 5 and the like.

Figure 14A:
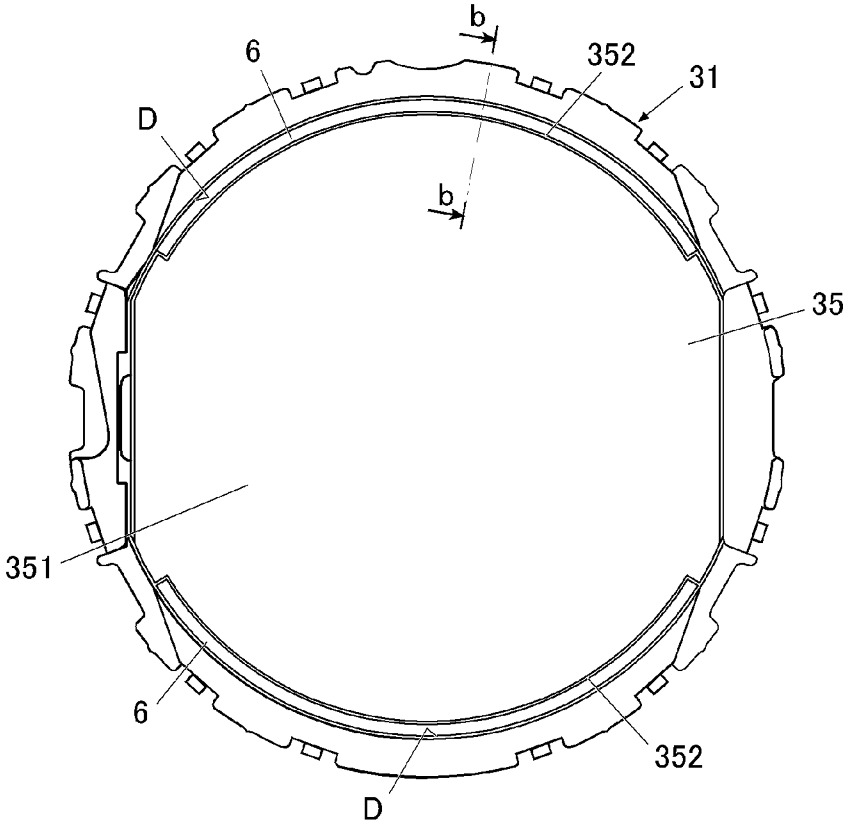
FIG. 14A is a plan view showing an example of a structure in which the connectors are arranged according to the present embodiment.

For example, as shown in FIG. 14A, a spacer 35 is provided between the display panel 5 and the substrate 4 in the module case 31 so that a space as an arrangement part D is formed between the outer periphery of the spacer 35 and the inner periphery of the module case 31. The connector 6 is to be arranged in the arrangement part D.

Because of the arrangement part D as described above, the connector 6 can be correctly positioned and can easily remain in the curved state.

Figure 14B:
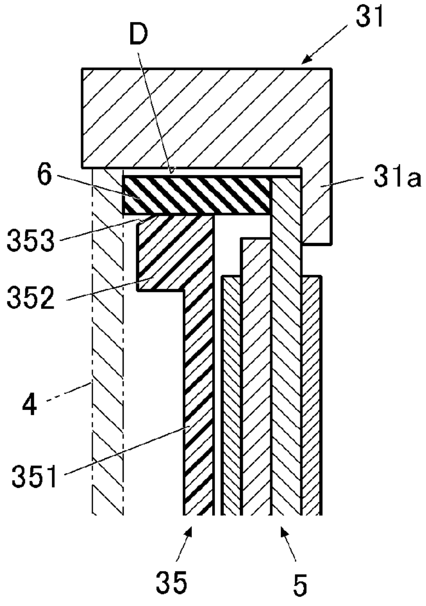
FIG. 14B is a cross-sectional view of the structure in FIG. 14A taken along a line b-b.

FIG. 14B is a cross-sectional view taken along the line b-b in FIG. 14A.

In FIG. 14A and FIG. 14B, the display panel 5 is arranged in the module case 31 from the back surface side (invisible side of the timepiece) of the module case 31, the connectors 6 are arranged at respective positions corresponding to the electrodes 52 of the display panel 5, and, after that, the substrate 4 is arranged such that the connection terminals 42 correspond to the connectors 6. The side on which the substrate 4 is arranged (the left side in FIG. 14B) is an insertion side from which the connectors 6 are inserted into the arrangement part D.

The substrate 4 is omitted in FIG. 14A, and the outline of the substrate 4 is shown by chain double-dashed lines in FIG. 14B.

The module case 31 in FIG. 14B has a flange 31*a* that projects inward from the opening edge on the front surface side (the visible side of the timepiece) such that the outer peripheral edge of the display panel 5 arranged from the back surface side of the module case 31 abuts against the back surface side of the flange 31*a*, and therefore the display panel 5 does not come off.

The spacer 35 has, for example, a main body 351 having a shape of a flat plate and a standing part 352 standing from the outer peripheral edge of the main body 351 toward the back surface side of the module case 31.

In the example shown in FIG. 14A and FIG. 14B, the arrangement parts D form spaces corresponding to the arrangement positions of the connectors 6 between the inner periphery of the module case 31 and the outer periphery of the standing part 352. In the present embodiment, the connector 6 is inserted from the side where the substrate 4 is arranged (that is, from the insertion side or from the left side in FIG. 14B), and is arranged in the arrangement part D.

The standing part 352 preferably has a chamfer that is a slope 353 at the edge formed by chamfering. The chamfering process of the arrangement part D is preferably performed on the insertion side where the connector 6 is inserted. In the present embodiment, the chamfering process of the arrangement part D is performed at the edge on the side where the substrate 4 is arranged (that is, on the insertion side or on the left side in FIG. 14B).

Because of the chamfer, the connector 6 in the curved state can be smoothly inserted into the arrangement part D without being caught at the edge of the arrangement part D.

The degree of the chamfering process is not particularly limited, and the chamfer may be formed more deeply than in the illustrated example (such that a larger slope 353 is formed). The chamfer may be further processed to have a round corner. This makes it possible to insert the connector 6 into the arrangement part D more smoothly.

The arrangement part D in which the connector 6 is arranged is not limited to be the space between the inner peripheral surface of the module case 31 and the outer peripheral surface of the standing part 352.

For example, the arrangement part D in which the connector 6 is to be arranged may be a notch, a slit-shaped hole, or the like formed inside the module case 31 or at the outer periphery of the spacer 35.

Also at the edge of such an arrangement part D, the chamfering process is preferably performed on the insertion side where the connector 6 is inserted.

In the examples of the present embodiment, the display device 50 is embedded in the timepiece 100, but the device where the display device 50 is embedded is not limited to the timepiece 100.

The display device 50 can be widely applied to any electronic device provided with a display device that performs various display operation, for example, a biological information display device such as a pedometer, a heart rate monitor, and a pulse meter, and an electronic device that displays various kinds of information such as travel distance, travel pace information, altitude information, and barometric pressure information, or the like.

Although some embodiments have been described in the above, the scope of the present invention is not limited thereto but includes the scope of the invention recited in the claims and the scope of their equivalents.

What is claimed is:

1. A display device comprising:

a display panel that has a non-linear part at least at a part of an outer edge of the display panel;

a bent connector arranged along the non-linear part and electrically connected to the display panel; and a substrate that is electrically connected to the display panel by the bent connector, wherein the display panel has electrodes that are connected to a first side of the bent connector, wherein the electrodes are arranged along the non-linear part, wherein the substrate has connection terminals that are connected to a second side of the bent connector that is not the first side, wherein the connection terminals are arranged non-linearly corresponding to the electrodes of the display panel, wherein the substrate has a wiring area in which wires are arranged, the wiring area including a bundle area and an unbundle area, wherein the wires are connected to the connection terminals, wherein the wires are bundled in the bundle area, wherein the wires diverge from the bundle area toward the connection terminals in the unbundle area, wherein the unbundle area is along the non-linear part and corresponds to the connection terminals, and wherein the substrate has an antenna arranged in an area that does not overlap the wiring area in a vertical direction to the substrate.

2. A display device comprising:

a display panel that has a non-linear part at least at a part of an outer edge of the display panel;

a bent connector arranged along the non-linear part and electrically connected to the display panel; and a substrate that is electrically connected to the display panel by the bent connector, wherein the display panel has electrodes that are connected to a first side of the bent connector, wherein the electrodes are arranged along the non-linear part, wherein the substrate has connection terminals that are connected to a second side of the bent connector that is not the first side, wherein the connection terminals are arranged non-linearly corresponding to the electrodes of the display panel, wherein the substrate has a wiring area in which wires are arranged, the wiring area including a bundle area and an unbundle area, wherein the wires are connected to the connection terminals, wherein the wires are bundled in the bundle area, wherein the wires diverge from the bundle area toward the connection terminals in the unbundle area, wherein the unbundle area is along the non-linear part and corresponds to the connection terminals, and wherein a battery is arranged in an area that overlaps the wiring area in a vertical direction to the substrate.

3. The display device according to claim 1, wherein the bent connector has a curved shape depending on curvature of the non-linear part.

4. The display device according to claim 3, wherein the bent connector has insulating parts and conductive parts that are arranged alternately in an extending direction of the bent connector.

5. The display device according to claim 4, wherein the bent connector is bent by a larger amount per unit volume at the conductive parts than at the insulating parts.

6. The display device according to claim 3, wherein the bent connector has an outer surface that is arranged facing a convex side of the non-linear part larger than an inner surface that is arranged facing in a concave side of the non-linear part.

7. The display device according to claim 3, wherein the bent connector has a flexible part that is bent to a curved shape along the non-linear part.

8. The display device according to claim 7, wherein the flexible part is a conductive part that is formed of a conductive member.

9. The display device according to claim 1, wherein the bent connector has an uneven surface on a lateral surface, the uneven surface including recesses and projections that are alternately arranged in an extending direction of the bent connector.

10. The display device according to claim 9, wherein the recesses are each formed of an insulating member and the projections are each formed of a conductive member.

11. The display device according to claim 1, further comprising:

a case having an arrangement part in which the bent connector along the non-linear part is arranged, wherein the case has a chamfer at an edge of the arrangement part.

12. A timepiece comprising:

the display device according to claim 1.

13. The display device according to claim 2, wherein the bent connector has a curved shape depending on curvature of the non-linear part.

14. The display device according to claim 13, wherein the bent connector has insulating parts and conductive parts that are arranged alternately in an extending direction of the bent connector.

15. The display device according to claim 14, wherein the bent connector is bent by a larger amount per unit volume at the conductive parts than at the insulating parts.

16. The display device according to claim 13, wherein the bent connector has an outer surface that is arranged facing a convex side of the non-linear part larger than an inner surface that is arranged facing in a concave side of the non-linear part.

17. The display device according to claim 13, wherein the bent connector has a flexible part that is bent to a curved shape along the non-linear part, and wherein the flexible part is a conductive part that is formed of a conductive member.

18. The display device according to claim 2, wherein the bent connector has an uneven surface on a lateral surface, the uneven surface including recesses and projections that are alternately arranged in an extending direction of the bent connector, and wherein the recesses are each formed of an insulating member and the projections are each formed of a conductive member.

19. The display device according to claim 2, further comprising:

a case having an arrangement part in which the bent connector along the non-linear part is arranged, wherein the case has a chamfer at an edge of the arrangement part.

20. A timepiece comprising:

the display device according to claim 2.

* * * * *